US011888349B2

(12) United States Patent
Kim et al.

(10) Patent No.: US 11,888,349 B2
(45) Date of Patent: Jan. 30, 2024

(54) STATOR ASSEMBLY OF HAIRPIN WINDING MOTOR AND MANUFACTURING METHOD THEREOF

(71) Applicant: HYUNDAI MOBIS Co., Ltd., Seoul (KR)

(72) Inventors: Yong Ho Kim, Yongin-si (KR); Min Mo Koo, Sejong-si (KR); Joon Hyung Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 17/108,929

(22) Filed: Dec. 1, 2020

(65) Prior Publication Data

US 2021/0175784 A1 Jun. 10, 2021

(30) Foreign Application Priority Data

Dec. 4, 2019 (KR) .................. 10-2019-0159499

(51) Int. Cl.
*H02K 1/16* (2006.01)
*H02K 15/02* (2006.01)
*H02K 15/085* (2006.01)
*H02K 15/06* (2006.01)

(52) U.S. Cl.
CPC .............. *H02K 1/165* (2013.01); *H02K 1/16* (2013.01); *H02K 15/026* (2013.01); *H02K 15/064* (2013.01); *H02K 15/085* (2013.01)

(58) Field of Classification Search
CPC ...... H02K 1/165; H02K 1/148; H02K 15/064; H02K 1/16; H02K 1/18; H02K 1/185
See application file for complete search history.

(56) References Cited

U.S. PATENT DOCUMENTS

| | | | |
|---|---|---|---|
| 9,859,764 B2 | 1/2018 | Tsuki et al. | |
| 11,088,601 B2 | 8/2021 | Hino et al. | |
| 2001/0011852 A1* | 8/2001 | Nakamura | ............... H02K 3/34 310/201 |
| 2002/0113518 A1 | 8/2002 | Hsu | |
| 2003/0168926 A1 | 9/2003 | Zepp et al. | |
| 2017/0201134 A1 | 7/2017 | Motoishi et al. | |
| 2021/0203197 A1* | 7/2021 | Saint-Michel | ....... H02K 15/024 |

FOREIGN PATENT DOCUMENTS

| | | | |
|---|---|---|---|
| DE | 102013006622 | 10/2014 | |
| DE | 112013003663 | 4/2015 | |
| DE | 112017002458 | 1/2019 | |
| EP | 3661017 | 6/2020 | |
| JP | S50-60702 | 5/1975 | |
| JP | 10271716 A * | 10/1998 | ............. H02K 1/148 |
| JP | 2001128394 | 5/2001 | |
| JP | 2004236443 | 8/2004 | |
| JP | 2009077534 | 4/2009 | |
| JP | 2010-041795 | 2/2010 | |

(Continued)

*Primary Examiner* — Livius R. Cazan
(74) *Attorney, Agent, or Firm* — H.C. Park & Associates, PLC

(57) ABSTRACT

A stator assembly of a hairpin winding motor including hairpin coils continuously connected along a circumferential direction to form a coil winding; and a stator core configured to fix the hairpin coils. Outer circumferential surfaces of the hairpin coils formed in the circumferential direction contact an inner circumferential surface of the stator core.

4 Claims, 10 Drawing Sheets

(56) References Cited

FOREIGN PATENT DOCUMENTS

| | | | |
|---|---|---|---|
| JP | 5352979 B2 | * 11/2013 | |
| JP | 6329981 | 5/2018 | |
| KR | 10-2002-0011819 | 2/2002 | |
| KR | 10-2015-0012358 | 2/2015 | |
| WO | 2010023117 | 3/2010 | |
| WO | WO-2010023117 A1 | * 3/2010 | ............. H02K 23/30 |

* cited by examiner

STATOR ASSEMBLY OF HAIRPIN WINDING MOTOR AND MANUFACTURING METHOD THEREOF

CROSS-REFERENCE TO RELATED APPLICATION

This application claims priority to and the benefit of Korean Patent Application No. 10-2019-0159499, filed on Dec. 4, 2019 which is hereby incorporated by reference for all purposes as if set forth herein.

BACKGROUND

Field

Exemplary embodiments relate to a stator assembly of a hairpin winding motor and a manufacturing method thereof, and more particularly, to a stator assembly of a hairpin winding motor of which the weight and volume are reduced to reduce the weight and secure an inner space of an automobile and a manufacturing method thereof.

Discussion of the Background

Research and development, and commercialization of eco-friendly automobile-related parts have actively proceeded in the automobile industry according to international demands for greenhouse gas reduction regulations and improvement of fuel efficiency of automobiles.

A technology for exerting a driving force using an electric motor is in development as a kind of an eco-friendly automobile-related part, and especially for this, a motor productivity technology including motor operating efficiency is also required.

Carmakers and manufacturers of eco-friendly parts apply hairpin coils to driving motors as a part of technology development to reduce the weight and volume of the eco-friendly parts.

Due to development of a technology for reducing the weight and volume of the eco-friendly parts, the weight of a vehicle or an eco-friendly vehicle can be reduced and an inner space can be secured.

A stator core of a driving motor to which a hairpin coil is applied according to the related art is formed of a magnetic material, and includes a yoke forming a magnetic path and a plurality of teeth spaced apart from each other at intervals to protrude radially inward from the yoke, and a plurality of hairpin coils are inserted into a plurality of slots formed by the plurality of teeth spaced apart from each other at intervals.

Meanwhile, a method of manufacturing the stator core according to the related art is generally classified into a method in which shoes are formed on end portions of the teeth of the stator core and the hairpin coils are inserted in an axial direction, and a method in which the shoes of the teeth are removed and the hairpin coils are inserted in a radial direction.

First, in the method in which shoes are formed on the end portions of the teeth of the stator core and the hairpin coils are inserted in the axial direction, the hairpin coil is molded or formed in a U-shaped shape so that a coil or ring having a generally angular cross-section can be inserted into the slot of the stator core in advance, thereby making the hairpin coil.

Further, the shoes formed on inner side ends of the teeth in a radial direction fix the hairpin coils inserted into the slots.

A method of manufacturing the driving motor to which the hairpin coil is applied, in which the shoes are formed on the end portions of the teeth, and the hairpin coils are inserted in the axial direction includes winding by inserting roughly 100 to 150 hairpin coils into the stator core and then twisting and welding opposite end portions, and even when one welding defect occurs at the ends of the hairpin coils, there is a problem that the hairpin coils cannot be used as a whole welding failure.

Further, when coils each having an angular cross-sectional area are twisted and bent to wind the hairpin coils, a film is thinned or damaged and thus the insulation performance is degraded in a process of forming the coils at a high load.

In the method in which the shoes of the teeth are removed and the hairpin coils are inserted in the radial direction, since stator core shoe portions are removed when stator divided cores are inserted in a radial direction after a hairpin winding bundle is made, noise, vibration, and harshness (NVH) are generated due to an increase of cogging torque and torque ripples, and the performance is adversely affected.

Accordingly, in this field, a method of increasing productivity of the stator core by reducing a defective rate, reducing the cogging torque and the torque ripples, and improving a fixing force of the hairpin coils is being sought, but no satisfactory results have yet been obtained.

The above information disclosed in this Background section is only for enhancement of understanding of the background of the invention and, therefore, it may contain information that does not constitute prior art.

SUMMARY

Exemplary embodiments of the present invention provide a stator assembly of a hairpin winding motor capable of increasing productivity of a stator core by reducing a defective rate, reducing cogging torque and torque ripples, and improving a fixing force of hairpin coils, and a manufacturing method thereof.

Additional features of the invention will be set forth in the description which follows, and in part will be apparent from the description, or may be learned by practice of the invention.

An exemplary embodiment of the present invention provides a stator assembly of a hairpin winding motor including hairpin coils continuously connected along a circumferential direction to form a coil winding; and a stator core configured to fix the hairpin coils. Outer circumferential surfaces of the hairpin coils formed in the circumferential direction come into contact with an inner circumferential surface of the stator core.

Each of the hairpin coils may include a head portion exposed to the outside of the stator core in an axial direction, and leg portions configured to extend from one end and the other end of the head portion to be inserted into a core slot of the stator core, and the leg portions may be formed in a shape which is repeated in the circumferential direction by one pole pitch to be continuously connected.

A cross-section of the leg portion may be formed in a trapezoidal shape of which the outside is broad and the inside is narrow, and thus a width may decrease in a direction toward an inner diameter from an outer diameter of the stator core.

The stator core may include a ring core formed in a cylindrical shape and in which the hairpin coils are disposed, and a plurality of pin cores inserted into the ring core to fix the hairpin coils to the ring core.

The ring core may include a yoke formed of a magnetic material to form a magnetic path, a plurality of assembly parts protruding from an inner circumferential surface of the yoke in a radial direction, and core slots formed between the plurality of assembly parts.

The pin core may include a plurality of insertion parts inserted into the core slots, teeth inserted between the leg portions of the hairpin coil, and shoes configured to extend in both directions of one end opposite insertion directions into the core slots from the insertion parts to connect the plurality of insertion parts.

A height of the pin core may be the same as a height of the ring core.

One end of the pin core coupled to the ring core and the other end of the pin core configured to fix the hairpin coil may have the same width.

The insertion part may include a tab portion formed at the other end thereof in the insertion direction into the core slot, and bent portions formed in directions facing each other at positions spaced apart from the tab portion in one end direction.

The teeth may be composed of two to four teeth, and the teeth adjacent to each other may be connected by the shoe.

Another exemplary embodiment of the present invention provides a method of manufacturing a stator assembly of a hairpin winding motor, in which hairpin coils are wound around a stator core having a plurality of core slots, the method including: providing the hairpin coils continuously connected; inserting a fixing jig from a lower portion of the hairpin coils; inserting a pin core forming the stator core between the hairpin coils; and removing, by a ring core forming the stator core, the fixing jig from the hairpin coils. The pin core is supported by the fixing jig.

The fixing jig may include a body part forming a body, insertion grooves formed in the body part at positions corresponding to the pin cores and into which the plurality of pin cores are inserted, and seating protrusions formed between the plurality of insertion grooves at a lower portion of the body part to support the pin cores.

An inner diameter of the body part and an inner diameter of the seating protrusion may be formed to have the same size.

The inserting of the pin core between the hairpin coils may include inserting the pin core between the hairpin coils from the inside to the outside of the hairpin coil in a radial direction.

The removing of the fixing jig from the hairpin coils may include pressurizing, by the ring core forming the stator core, the fixing jig downward in an axial direction and removing the fixing jig from the hairpin coils.

An outer circumferential surface of each of the hairpin coils may come into contact with an inner circumferential surface of the ring core, and an inner circumferential surface of each of the hairpin coils may come into contact with an inner side surface of the pin core.

The ring core may include core slots formed at positions corresponding to the insertion grooves and into which the plurality of pin cores are inserted when the ring core pressurizes the fixing jig in an axial direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF EXEMPLARY EMBODIMENTS

Figure 1:
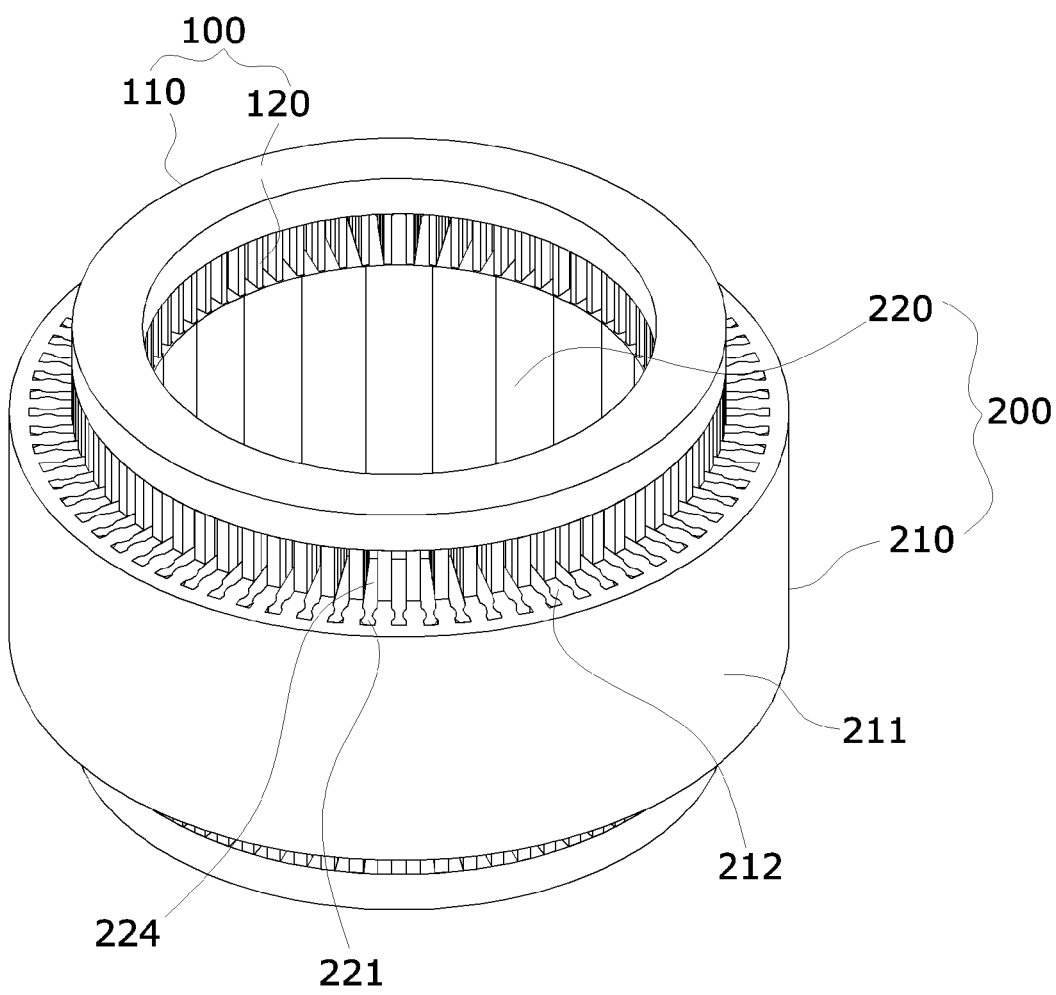
FIG. 1 is a perspective view illustrating a stator assembly of a hairpin winding motor according to one embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Advantages and characteristics of the present disclosure, and a method of achieving the above, will be apparent with reference to embodiments which will be described in detail in conjunction with the accompanying drawings. However, the present disclosure is not limited to the embodiments which will be described below and may be implemented in different forms. The embodiments are only provided to completely disclose the present disclosure and completely convey the scope of the present disclosure to those skilled in the art, and the present disclosure is defined by the disclosed claims. Meanwhile, terms used in the description are provided not to limit the present disclosure but to describe the embodiments. In the embodiment, the singular form is intended to also include the plural form unless the context clearly indicates otherwise. The terms "comprise" and/or "comprising" as used herein do not preclude the presence or addition of at least one other component, step, operation, and/or element other than the stated components, steps, operations and/or elements.

Hereinafter, preferable embodiments of the present disclosure will be described in detail with reference to the accompanying drawings.

Figure 2:
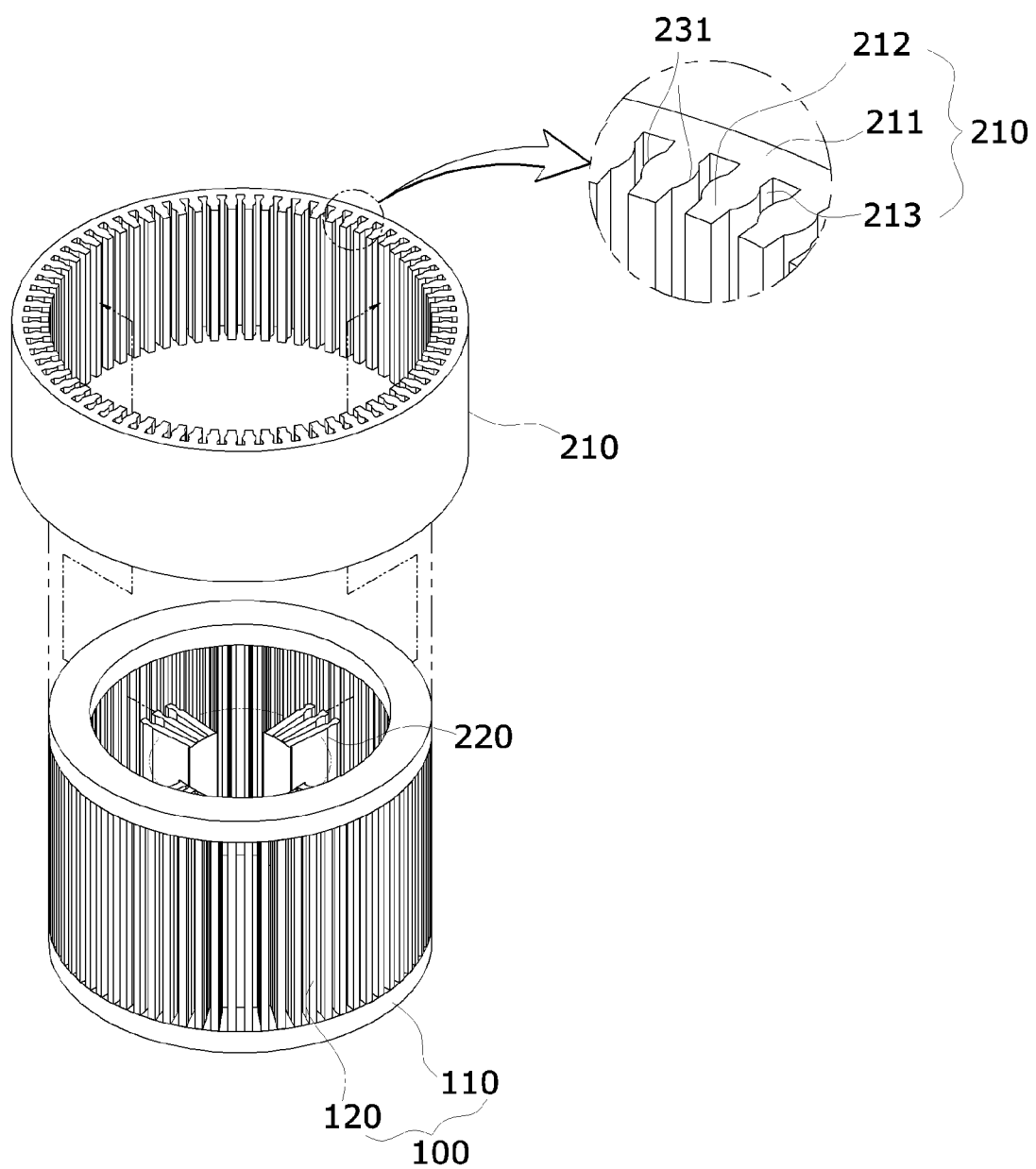
FIG. 2 is an exploded perspective view illustrating the stator assembly of the hairpin winding motor according to one embodiment of the present disclosure.
Figure 3:
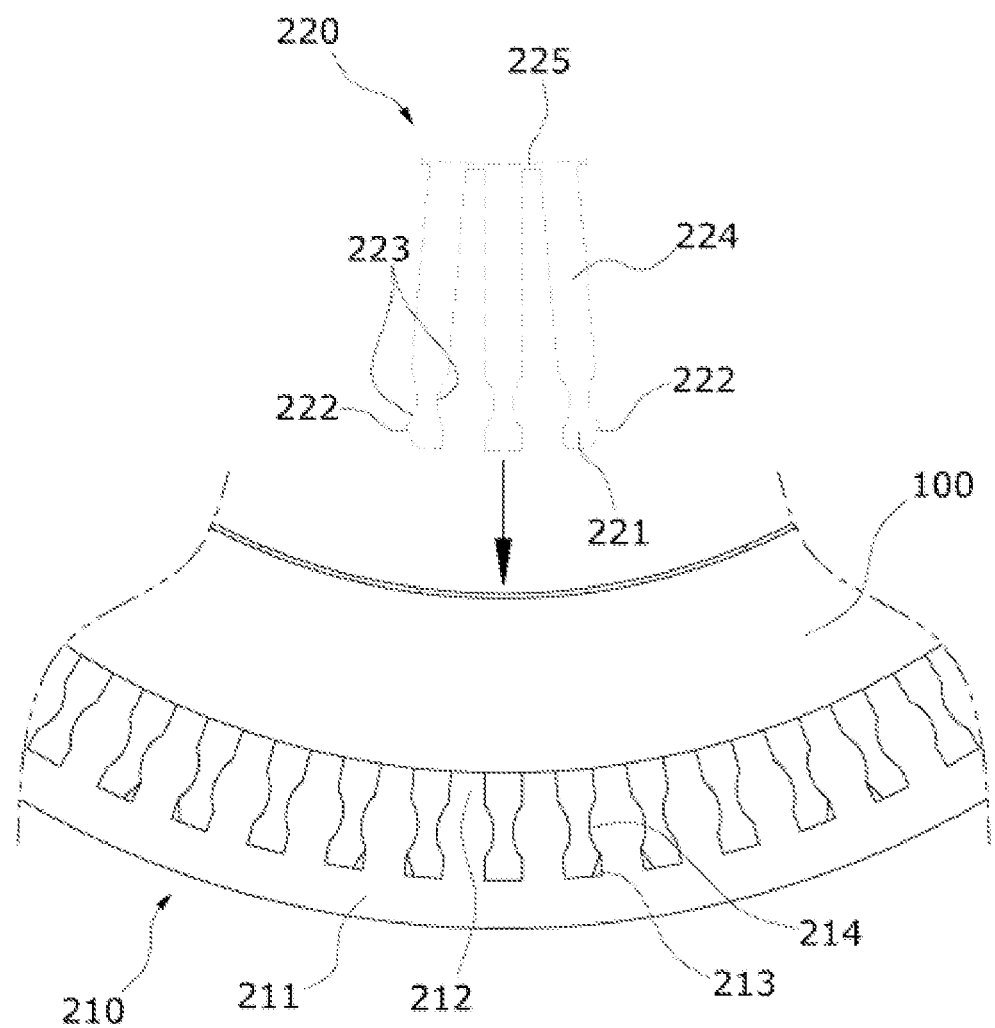
FIG. 3 is a plan view illustrating a coupling state between a pin core and a hairpin coil of the stator assembly of the hairpin winding motor according to one embodiment of the present disclosure and a stator core.
Figure 4:
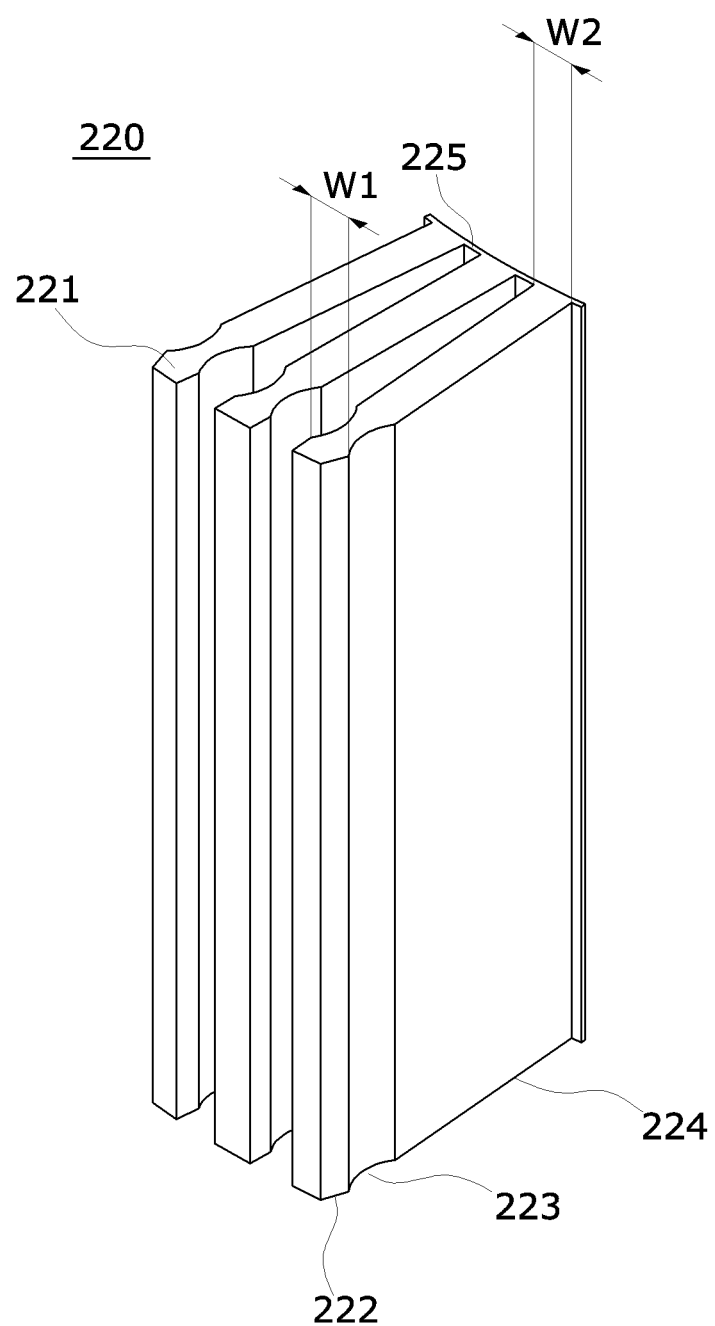
FIG. 4 is a perspective view illustrating pin cores of the stator assembly of the hairpin winding motor according to one embodiment of the present disclosure.

FIG. 1 is a perspective view illustrating a stator assembly of a hairpin winding motor according to one embodiment of the present disclosure, FIG. 2 is an exploded perspective view illustrating the stator assembly of the hairpin winding motor according to one embodiment of the present disclosure, FIG. 3 is a plan view illustrating a coupling state between a pin core and a hairpin coil of the stator assembly of the hairpin winding motor according to one embodiment of the present disclosure, and FIG. 4 is a perspective view illustrating pin cores of the stator assembly of the hairpin winding motor according to one embodiment of the present disclosure.

Referring to FIGS. 1 to 4, the stator assembly of the hairpin winding motor according to one embodiment of the present disclosure includes a plurality of hairpin coils 100 and a stator core 200.

The hairpin coils 100 are continuously connected to each other to form a coil winding in a circumferential direction, and outer circumferential surfaces of the hairpin coils 100 come into contact with an inner circumferential surface of the stator core 200.

Further, the hairpin coils 100 form the coil winding as end portions outwardly exposed in an axial direction from the stator core 200 are connected to each other, and raw coils coated with a coating and formed to have a straight length of a predetermined diameter are processed through a coil processor, and have connecting portions connected to each other.

In addition, a predetermined number of hairpin coils 100 are fitted into one slot in a stacked state to form the winding.

Each hairpin coil 100 includes a head portion 110 and leg portions 120.

The head portion 110 is bent in a U-shape and outwardly exposed in the axial direction of the stator core 200, and serves as a connection portion configured to connect a pair of leg portions 120 due to extension of the leg portions 120 from one end and the other end thereof.

Meanwhile, in the drawings of the present disclosure, the head portion 110 is an item obvious to those skilled in the art, and thus is schematically shown not to obscure the principle of the present disclosure.

The leg portions 120 extend from one end and the other end of the head portion 110 in parallel and are inserted into a core slot 213 of the stator core 200, and are repeated in a circumferential direction by one pole pitch and formed in a continuously-connected shape.

Since the plurality of hairpin coils 100 are continuously connected as described above, the coil winding is formed in the circumferential direction.

Further, in the hairpin coil 100, two leg portions 120 disposed adjacent to each other in the circumferential direction are welded to each other.

Meanwhile, a cross-section of the leg portion 120 is formed in a trapezoidal shape.

More specifically, a cross-sectional shape of the leg portion 120 is formed in a shape of which the outside is wider than the inside, and thus a width decreases in a direction toward an inner diameter from an outer diameter of the stator core 200.

The stator core 200 fixes the plurality of hairpin coils 100, and includes a ring core 210 and pin cores 220.

The ring core 210 may be formed in a cylindrical shape, and the hairpin coils 100 are disposed in the ring core 210.

The ring core 210 includes a yoke, an assembly part, and core slots.

A yoke 211 forms a body of the ring core 210, is formed of a magnetic material to form a magnetic path, and fixes the hairpin coils 100.

A plurality of assembly parts 212 protrude from an inner circumferential surface of the yoke 211 in a radial direction, and are continuously disposed in the radial direction from the inner circumferential surface of the yoke 211 to form an overall circular ring shape.

The core slots 213 are formed between the plurality of assembly parts 212, and specifically, are formed at spaces between the plurality of assembly parts 212 radially spaced apart a distance from each other along the circumferential direction at the inner circumferential surface of the yoke 211.

The core slots 213 have slot openings formed therein when the stator core 200 is inwardly opened, and are outwardly closed by the yoke 211.

Meanwhile, the outer circumferential surfaces of the hairpin coils 100, which are wound in the circumferential direction, are disposed in a simple contact state with an inner circumferential surface of the ring core 210.

Accordingly, the hairpin coils 100 may inevitably separate from the ring core 210.

To prevent this, the present disclosure includes the pin cores 220.

As shown in FIG. 2, a plurality of pin cores 220 are formed in a number corresponding to the number of core slots 213 to be inserted into the core slots 213 to fix the hairpin coils 100 to the ring core 210.

Specifically, the pin cores 220 are inserted into the core slots 213 in a state in which the outer circumferential surfaces of the hairpin coils 100 come into contact with the inner circumferential surfaces of the ring core 210.

That is, since the pin cores 220 are inserted into the core slots 213 through the hairpin coils 100 in a state in which the hairpin coils 100 are disposed between the pin cores 220 and the ring core 210, the hairpin coils 100 may be solidly fixed to the ring core 210.

The pin core 220 is formed to have the same height as that of the core slot 213, that is, a height of the ring core 210.

In this case, as shown in FIG. 3, the pin cores 220 may be inserted in a radial direction.

As shown in FIG. 4, the pin core 220 includes insertion parts 221, teeth 224, and shoes 225.

The insertion parts 221 each have a rectangular cross-section and are each inserted into the core slots 213, and a bent portion 223 is formed in each insertion part 221.

A tab portion 222 is formed in some of the insertion parts 221 at an end of the insertion part 221 which is inserted into the core slot 213, and is formed in a shape inclined from a side surface of the connected tooth 224.

That is, when the insertion parts 221 having the tab portions 222 are inserted into the core slots 213, since inclined surfaces of the tab portions 222 come into contact with the assembly parts 212 and thus, an insertion direction of the pin cores 220 is guided, the insertion parts 221 may be accurately inserted into the core slots 213.

Accordingly, assembly defects generated when the pin cores 220 are assembled to the ring core 210 may be reduced.

The bent portions 223 are formed in directions facing each other at positions spaced apart from the tab portion 222 in one end direction in the insertion part 221.

The bent portion 223 solidly prevents separation of the pin cores 220 inserted into the core slots 213 from the core slots 213.

Accordingly, a protruding portion 214 formed in a shape corresponding to the bent portion 223 of the insertion part 221 may be formed on an inner side surface of the core slot 213.

Accordingly, when the pin cores 220 are inserted into the core slots 213, since the bent portion 223 of the pin core 220 and the protruding portion 214 of the core slot 213 are coupled to each other, separation of the pin cores 220 from the core slots 213 may be effectively prevented, and the hairpin coils 100 disposed between the pin cores 220 and the ring core 210 may be solidly fixed to the stator core 200.

Meanwhile, the ring core 210 of the present disclosure is formed in a circular shape, and a cross-section of each of the leg portions 120 of the hairpin coil 100 inserted into the core slot 213 is formed in a trapezoidal shape of which the outside is wide and the inside is narrow.

Accordingly, in each pin core 220, one end coupled to the ring core 210 and the other end which fixes the hairpin coil 100 have the same width.

Specifically, as shown in FIG. 4, since the insertion part 221 of the pin core 220 disposed between the plurality of leg portions 120 is formed in a rectangular shape, a width W1 of one end which is an insertion direction into the coil slot 213 and a width W2 of the other end which is a direction opposite the insertion direction into the coil slot 213 are formed to be the same.

Accordingly, since a space factor between the leg portions 120 and the stator core 200 increases and a saturation degree of the stator core 200 decreases, magnetic flux density is uniform and thus, the output performance of a driving motor may be improved by roughly 3% to 5%.

Meanwhile, the pin cores 220 are inserted into the core slots 213 to fix the hairpin coils 100, and at least two teeth 224 should be connected to each other by the shoe 225.

The teeth 224 are inserted into spaces between the leg portions 120 of the hairpin coil 100 which are formed in plural.

Further, the shoes 225 extend in both directions opposite the insertion directions of the insertion parts 221 into the core slots 213, and come into contact with inner side surfaces of the hairpin coils 100 to support the hairpin coils 100.

Specifically, as shown in FIG. 4, the teeth 224 are composed of at least two to four of the teeth 224 according to specifications of the driving motor or a use environment, and the teeth 224 adjacent to each other are fixed by the shoes 225.

That is, since the teeth 224 inserted into the core slots 213 are formed in plural, an assembly time in which the pin cores 220 are assembled to the core slots 213 may be effectively reduced.

In the present disclosure, since the pin cores 220 are assembled to the ring core 210 in the state in which the hairpin coils 100 are disposed between the ring core 210 and the pin cores 220, the hairpin coils 100 may be solidly fixed to the ring core 210, and assembly productivity of the stator assembly may be improved.

Further, in the present disclosure, since cogging torque and torque ripples are reduced due to the presence of the pin cores 220 disposed between the hairpin coils 100 which are continuously connected to form the coil winding and the shoes 225 of the pin cores 220, noise, vibration, and harshness (NVH) are reduced, and accordingly, the performance of the driving motor may be improved.

In addition, since the leg portion 120 is formed in the trapezoidal shape of which the outside is broad and the inside is narrow, the magnetic flux density of the stator core 200 is uniform by increasing the space factor between the leg portion 120 and the slot, and accordingly, the output performance of the driving motor may be improved.

Hereinafter, a method of manufacturing the hairpin coils 100 according to one embodiment of the present disclosure will be described in detail with reference to the accompanying drawings.

Figure 5:
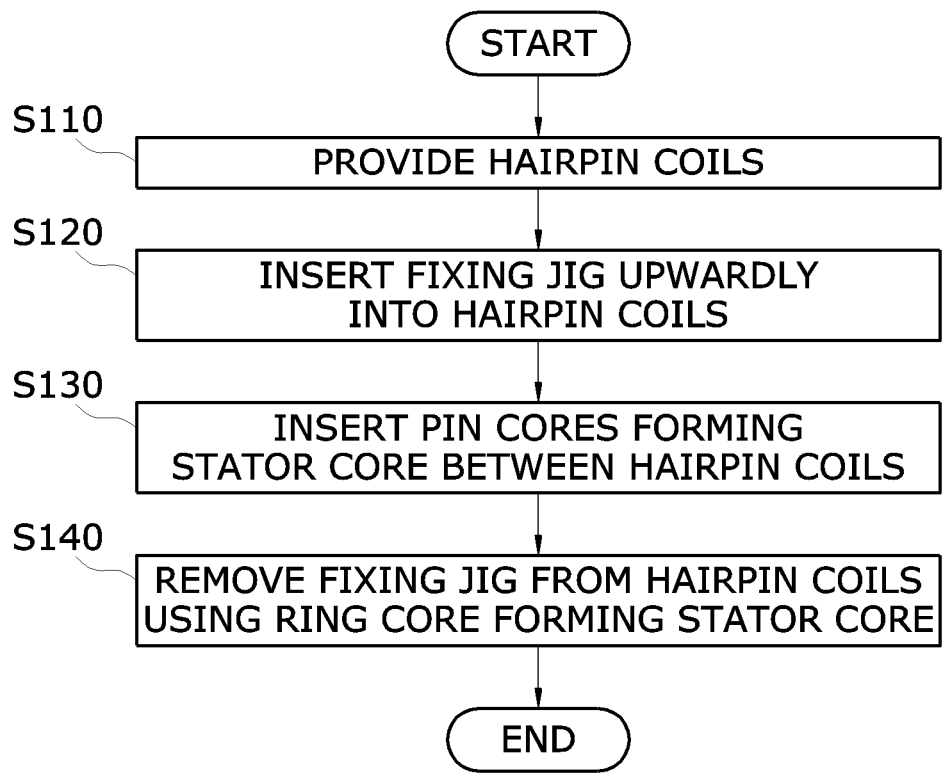
FIG. 5 is a flow chart illustrating a method of manufacturing the stator assembly of the hairpin winding motor according to one embodiment of the present disclosure.

FIG. 5 is a flow chart illustrating a method of manufacturing the stator assembly of the hairpin winding motor according to one embodiment of the present disclosure, and FIGS. 6A to 6E are assembly flow charts illustrating the method of manufacturing the stator assembly of the hairpin winding motor according to one embodiment of the present disclosure.

Figure 6A:
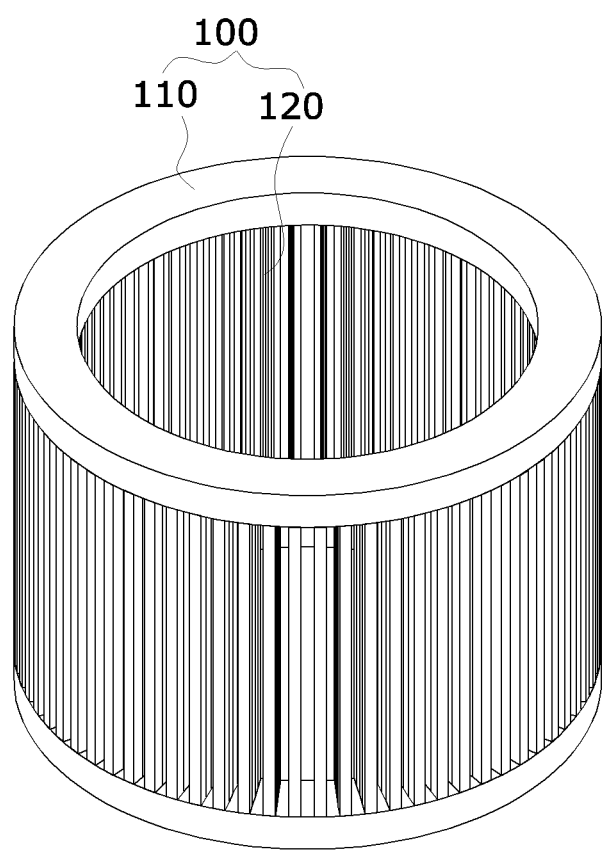
FIGS. 6A, 6B, 6C, 6D, and 6E are assembly flow charts of the method of manufacturing the stator assembly of the hairpin winding motor according to one embodiment of the present disclosure.

Referring to FIGS. 5 and 6A, first, a plurality of hairpin coils 100 continuously connected to each other in the circumferential direction to form a coil winding are provided (S110).

In the hairpin coils 100 of the present disclosure which form the coil winding, raw coils coated with a coating and formed to have a straight length of a predetermined diameter are processed through a coil processor, and have connecting portions connected to each other.

Figure 6B:
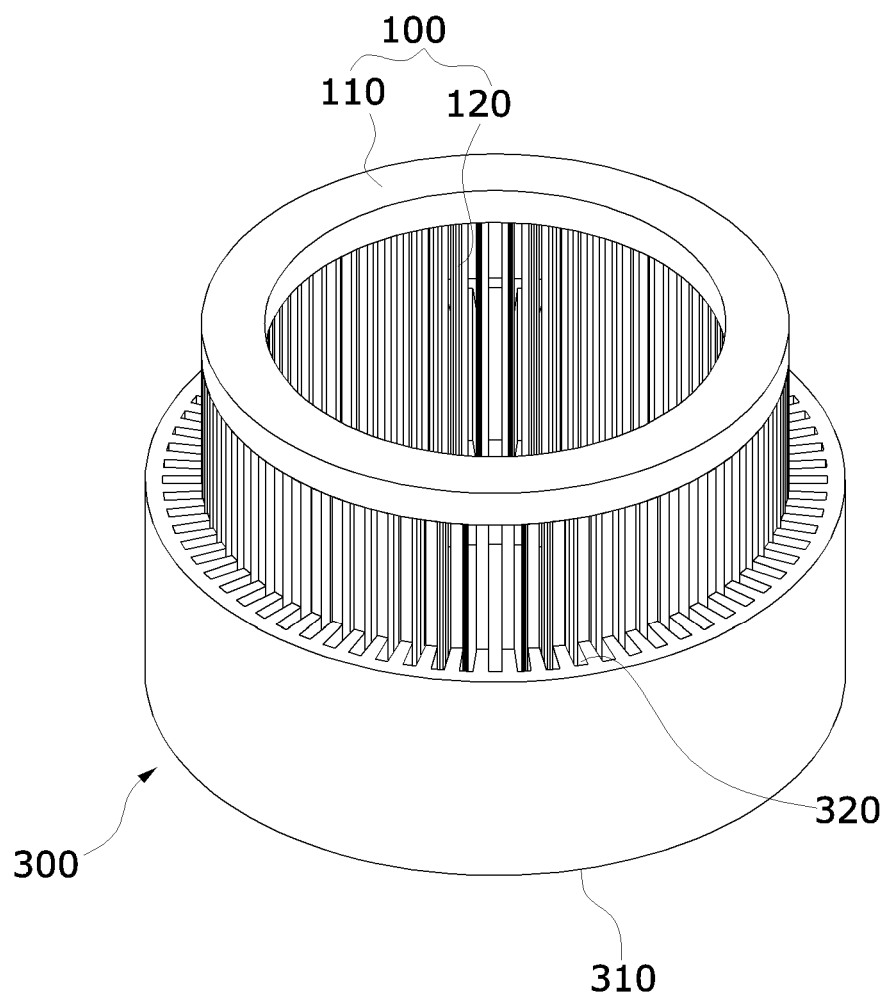

Further, referring to FIGS. 5 and 6B, a fixing jig 300 is inserted from a lower portion of the coil wound hairpin coils 100 (S120).

Meanwhile, the fixing jig 300 includes a body part 310, insertion grooves 320, and seating protrusions 330.

The body part 310 forms a body of the fixing jig 300.

Further, when the insertion grooves 320 are formed at positions corresponding to pin cores 220 of a stator core 200 to be described below in the body part 310 and thus the fixing jig 300 is disposed at the hairpin coils 100, the pin cores 220 are inserted into the insertion grooves 320.

The seating protrusions 330 are formed between the plurality of insertion grooves 320 at a lower portion of the body part 310 to support the pin cores 220.

An inner diameter of the seating protrusion 330 and an inner diameter of the body part 310 are formed to have the same size.

Figure 6C:
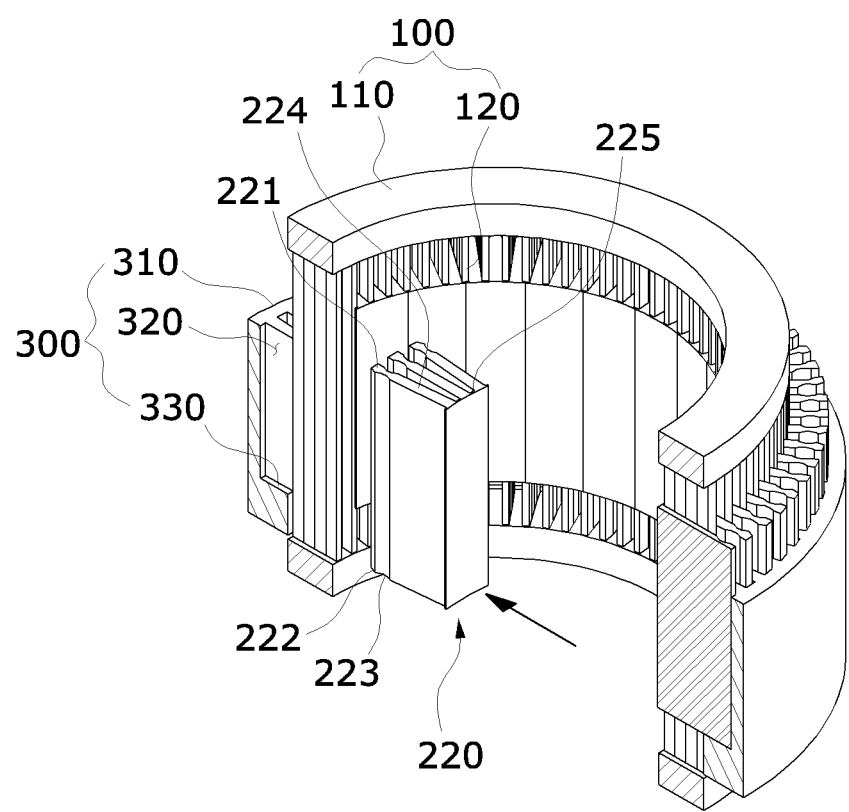

Further, referring to FIGS. 5 and 6C, the pin cores 220 forming the stator core 200 are inserted between the hairpin coils 100 (S130).

The pin cores 220 are inserted between the hairpin coils 100 which are continuously connected to form the coil winding from the inside to the outside of the hairpin coils 100 in the radial direction when inserted between the hairpin coils 100.

Accordingly, the pin cores 220 may be easily inserted between the hairpin coils 100.

Further, since the pin cores 220 may be inserted to be seated on the seating protrusions 330 of the fixing jig 300, the separation of the pin cores 220 from the hairpin coils 100 may be effectively prevented.

The pin core 220 is formed of insertion parts 221, teeth 224, and shoes 225, wherein the insertion parts 221 are inserted into core slots 213 of a ring core 210, the teeth 224 are inserted into spaces between the hairpin coils 100 which are continuously connected to form the coil winding, and the shoes 225 extend as both ends of an end portion of the tooth 224 in directions opposite a direction in which the hairpin coils 100 are disposed.

Further, the pin cores 220 are composed of at least two to four pin cores 220 according to specifications of the stator core 200 or a use environment, and the teeth 224 adjacent to each other may be connected by the shoes 225.

Accordingly, the assembly time in which the pin cores 220 are assembled to the core slots 213 may be effectively reduced.

Figure 6D:
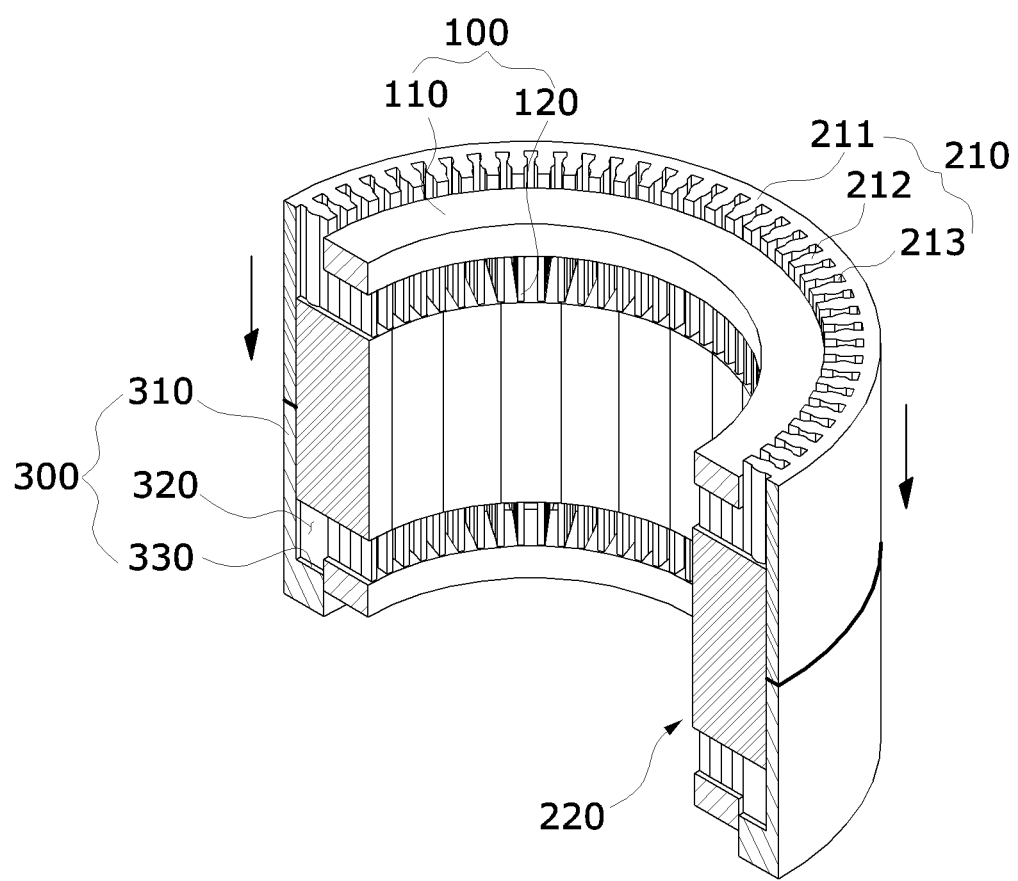

Further, referring to FIGS. 5 and 6D, the fixing jig 300 is removed from the hairpin coils 100 (S140).

In this case, the fixing jig 300 is removed through the ring core 210.

Specifically, the ring core 210 forming the stator core 200 downwardly pressurizes the fixing jig 300 in an axial direction while moving from upper portions of the hairpin coils 100 to lower portions of the hairpin coils 100.

Meanwhile, in the ring core 210, there are the core slots 213 formed at positions corresponding to the insertion grooves 320 and into which the plurality of pin cores 220 are inserted when the ring core 210 pressurizes the fixing jig 300 in the axial direction.

Accordingly, since the pin cores 220 are inserted into the core slots 213 and pressurizes the fixing jig 300 in the axial direction when the ring core 210 pressurizes the fixing jig 300, the fixing jig 300 may be easily removed from the hairpin coils 100.

Figure 6E:
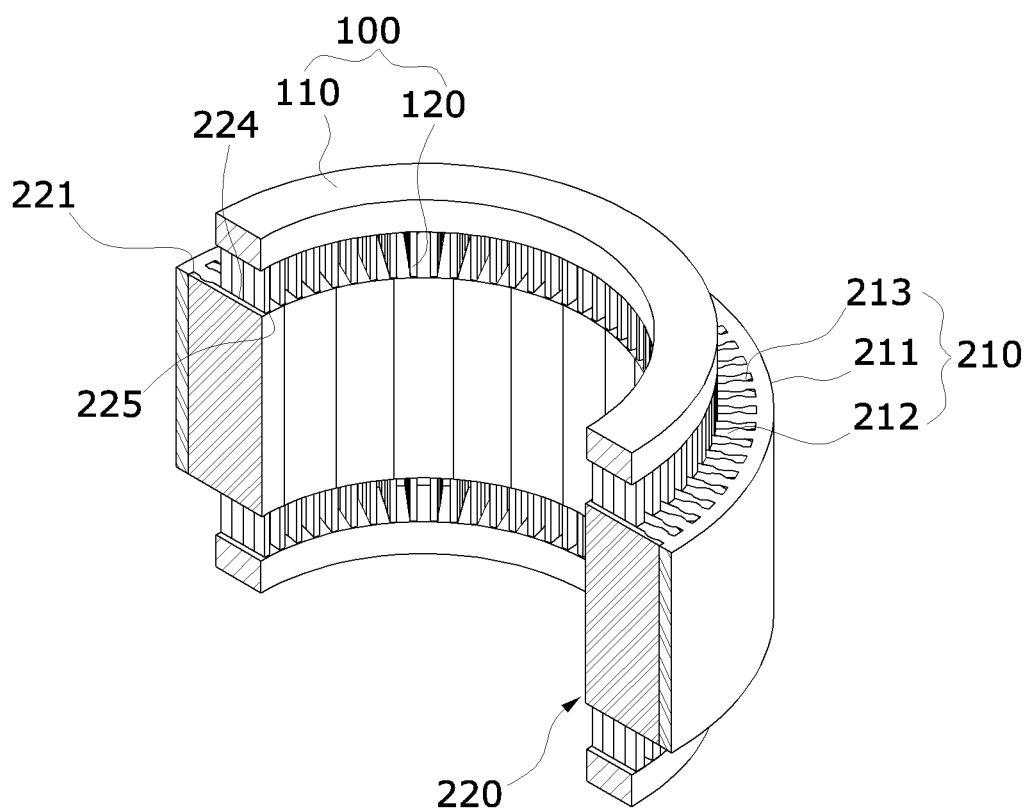

Further, as shown in FIG. 6E, in the process of removing the fixing jig 300 from the hairpin coils 100, a process of removing the fixing jig 300 from the hairpin coils 100, and a process of fixing the ring core 210 to the hairpin coils 100 may be simultaneously performed.

Accordingly, a structure in which the outer circumferential surfaces of the hairpin coils 100 come into contact with the inner circumferential surface of the ring core 210, and inner circumferential surfaces of the hairpin coils 100 come into contact with inner side surfaces of the pin cores 220 is formed, and coupling between the hairpin coils 100 and the stator core 200 is completed.

As described above, in the stator assembly of the hairpin winding motor according to the present disclosure, since the pin cores 220 are assembled to the ring core 210 in the state in which the hairpin coils 100 are disposed between the ring core 210 and the pin cores 220, the hairpin coils 100 may be solidly fixed to the ring core 210, and the assembly productivity of the stator assembly may be improved.

Further, since the ring core 210 comes into contact with the hairpin coils 100, the cogging torque and the torque ripples are reduced and thus the noise, vibration, and harshness (NVH) are reduced, and accordingly, the performance of the driving motor may be improved.

In addition, since the leg portion 120 is formed in the trapezoidal shape of which the outside is broad and the inside is narrow, the magnetic flux density of the stator core 200 is uniform by increasing the space factor between the leg portion 120 and the slot, and accordingly, the output performance of the driving motor may be improved.

In a stator assembly of a hairpin winding motor according to the present disclosure, since pin cores are assembled to a ring core in a state in which hairpin coils are disposed between the ring core and the pin cores, the hairpin coils can be solidly fixed to the stator core, and assembly productivity of the stator assembly can be improved.

Further, since the ring core comes into contact with the hairpin coils, cogging torque and torque ripples are reduced and thus noise, vibration, and harshness (NVH) are reduced, and accordingly, the performance of a driving motor can be improved.

In addition, since a leg portion is formed in a trapezoidal shape of which the outside is broad and the inside is narrow, magnetic flux density of a stator core is uniform by increasing a space factor between the leg portion and a slot, and accordingly, the output performance of a driving motor can be improved.

The present disclosure is not limited to the above-described embodiments and may be variously modified within the scope of the technical spirit of the present disclosure.

What is claimed is:

1. A stator assembly of a hairpin winding motor comprising:
   a plurality of hairpin coils continuously connected along a circumferential direction to form a coil winding; and
   a stator core configured to fix the hairpin coils,
   wherein:
   outer circumferential surfaces of the hairpin coils formed in the circumferential direction contact an inner circumferential surface of the stator core;
   each of the hairpin coils includes a head portion exposed to the outside of the stator core in an axial direction, and leg portions extending from one end and the other end of the head portion and configured to be inserted into a core slot of the stator core;
   the leg portions have a shape which is repeated in the circumferential direction by one pole pitch to be continuously connected;
   a cross-section of each leg portion has a trapezoidal shape of which the outside is wider than the inside, such that a width thereof decreases in a direction toward an inner diameter from an outer diameter of the stator core;
   the stator core includes a ring core formed in a cylindrical shape and in which the hairpin coils are disposed, and a plurality of pin cores are inserted into the ring core to fix the hairpin coils to the ring core;
   the ring core includes:
   a yoke formed of a magnetic material to form a magnetic path;
   a plurality of assembly parts protruding from an inner circumferential surface of the yoke in a radial direction; and
   core slots formed between the plurality of assembly parts;
   the plurality of pin cores include:
   a plurality of insertion parts at first ends of the pin cores, which are inserted into the core slots;
   teeth connected to the plurality of insertion parts and inserted between the leg portions of the hairpin coils; and
   shoes extending in both directions of second ends of the pin cores opposite the first ends of the pin cores to connect the plurality of insertion parts;
   each insertion part has a rectangular cross-sectional shape and includes;
     bent portions formed to face each other at positions spaced apart from an end of each insertion part which is inserted into the core slot;
   some, but not all, of the insertion parts further include a tab portion formed at the second end, the tab portion having a shape inclined from a side surface of the connected tooth; and
   each of the bent portions has a smooth, curved shape.

2. The stator assembly of claim 1, wherein a height of each pin core is the same as a height of the ring core.

3. The stator assembly of claim 1, wherein one end of the pin cores coupled to the ring core and the other end of the pin cores configured to fix the hairpin coils have the same width.

4. The stator assembly of claim 1, wherein:
   the teeth are composed of two to four teeth; and
   adjacent teeth are connected by a shoe.

* * * * *